(12) United States Patent
Eigemann et al.

(10) Patent No.: US 8,240,958 B2
(45) Date of Patent: Aug. 14, 2012

(54) INJECTION BOLT WITH A FIXED STATIC MIXER

(75) Inventors: Ernst August Eigemann, Bochum (DE); Ferdinand Coerschulte, Sundern (DE)

(73) Assignee: Minova International Limited (GB)

( * ) Notice: Subject to any disclaimer, the term of this patent is extended or adjusted under 35 U.S.C. 154(b) by 422 days.

(21) Appl. No.: 12/280,200

(22) PCT Filed: Feb. 26, 2007

(86) PCT No.: PCT/GB2007/000659
§ 371 (c)(1),
(2), (4) Date: May 21, 2009

(87) PCT Pub. No.: WO2007/096651
PCT Pub. Date: Aug. 30, 2007

(65) Prior Publication Data
US 2009/0324343 A1 Dec. 31, 2009

(30) Foreign Application Priority Data

Feb. 24, 2006 (DE) .......................... 10 2006 008 611
May 16, 2006 (DE) .......................... 10 2006 023 122
Feb. 3, 2007 (DE) .......................... 10 2007 005 540

(51) Int. Cl.
*E21D 20/00* (2006.01)
(52) U.S. Cl. .................................. 405/259.5; 405/259.1
(58) Field of Classification Search ............... 405/259.1, 405/259.2, 259.3, 259.4, 259.5, 259.6, 262
See application file for complete search history.

(56) References Cited

U.S. PATENT DOCUMENTS

| | | | | |
|---|---|---|---|---|
| 4,413,929 A * | 11/1983 | Kigawa et al. | ............. | 405/259.5 |
| 4,678,374 A * | 7/1987 | Calandra, Jr. | ............. | 405/259.6 |
| 4,696,606 A * | 9/1987 | Herron | ........................ | 405/259.3 |
| 6,588,986 B1 * | 7/2003 | Sibilla | ........................ | 405/259.5 |
| 2005/0134104 A1 * | 6/2005 | Simmons et al. | ............... | 299/31 |

FOREIGN PATENT DOCUMENTS

| | | | |
|---|---|---|---|
| DE | 3403688 C1 * | 9/1985 | |
| DE | 10017750 A1 | 10/2001 | |
| DE | 10321175 B3 | 8/2004 | |
| GB | 2073283 A | 10/1981 | |
| GB | 2241761 A * | 9/1991 | |
| JP | 3241114 A * | 10/1991 | ................. 405/295.5 |

(Continued)

OTHER PUBLICATIONS

Machine Translation DE 3403688 C1.*

(Continued)

*Primary Examiner* — Tara Mayo-Pinnock
*Assistant Examiner* — Benjamin Fiorello
(74) *Attorney, Agent, or Firm* — Westman, Champlin & Kelly, P.A.; Z. Peter Sawicki

(57) ABSTRACT

The invention provides an injection bolt for use in securing a rock mass having:
  a shaft for insertion into a hole in the rock mass which shaft has a profile and forms a profiled internal bore which bore has an inlet suitable for connection to an anchoring material pump and an outlet for injecting anchoring material into the hole in the rock mass; and
  a static mixer for mixing multiple components of the anchoring material; wherein the internal bore comprises the static mixer which is fixed in place by the profile; and a method for its production.

21 Claims, 4 Drawing Sheets

FOREIGN PATENT DOCUMENTS

| | | |
|---|---|---|
| JP | 2001164873 A | 6/2001 |
| WO | WO9607015 A1 | 3/1996 |

OTHER PUBLICATIONS

Nakakugi et al., JP 3241114A, Abstract Translation.*
Japanese Abstrat 08326499A, Mitsui Constr Co Ltd, Dec. 10, 1996.
PCT International Search Report, PCT/GB2007/000659, May 11, 2007.
Japanese Office Action 2008555876, Apr. 27, 2011 (English Translation).
Japanese Abstract H11080729 (English Translation).

* cited by examiner

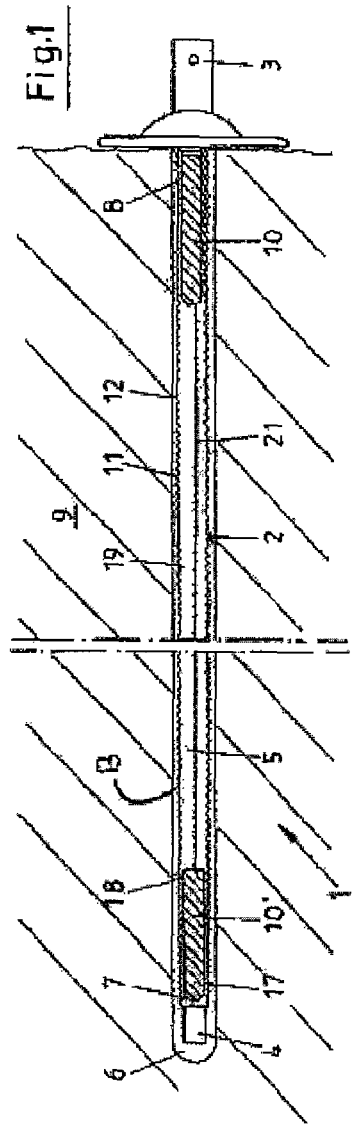
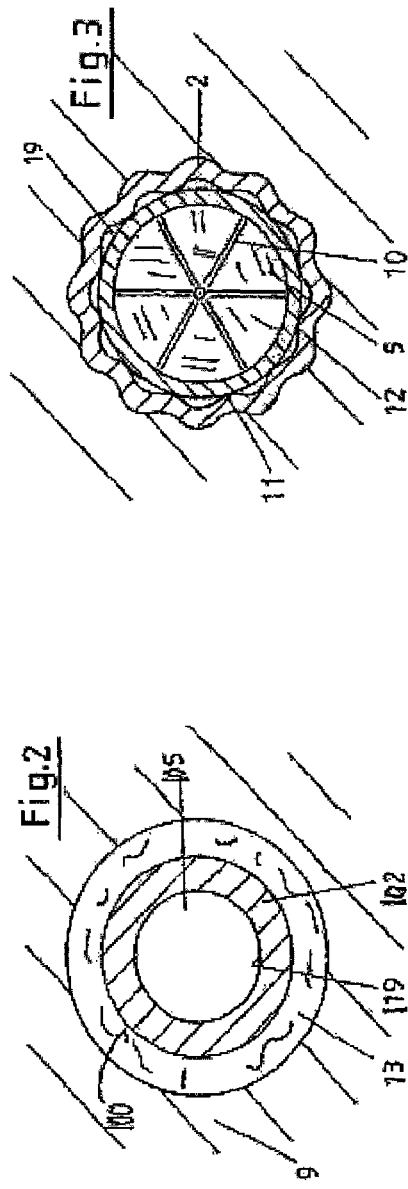
PRIOR ART

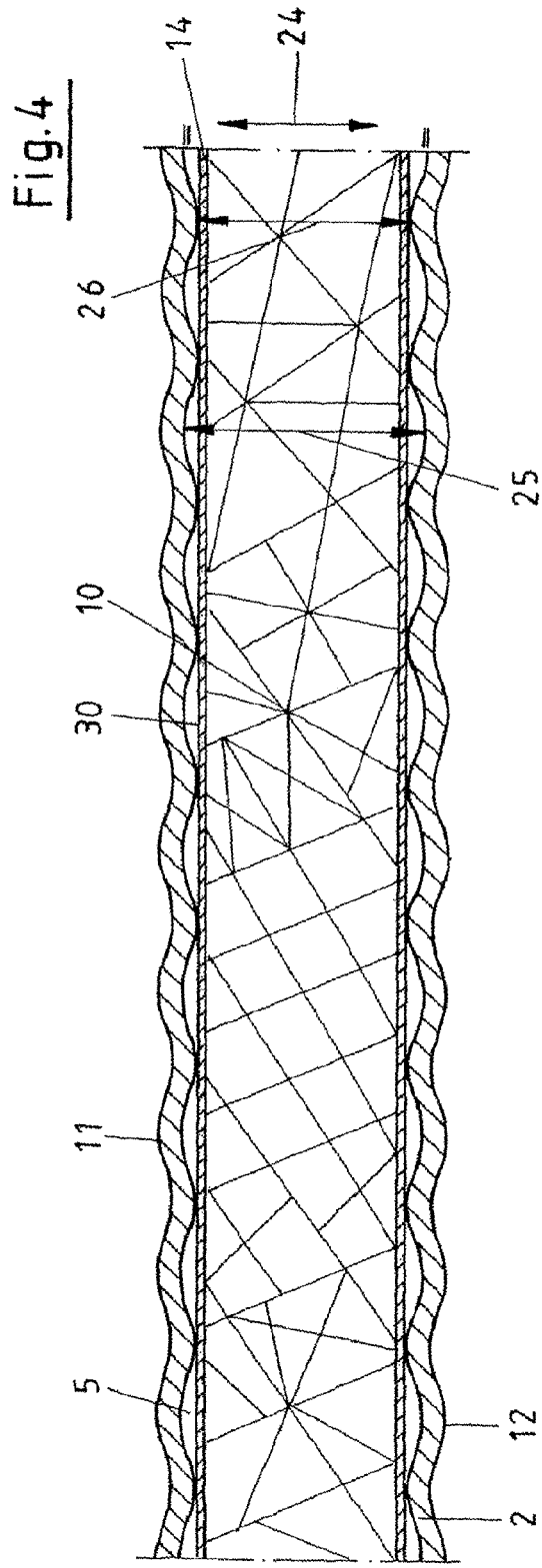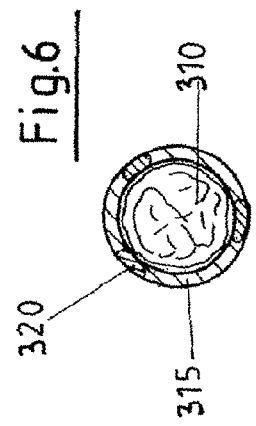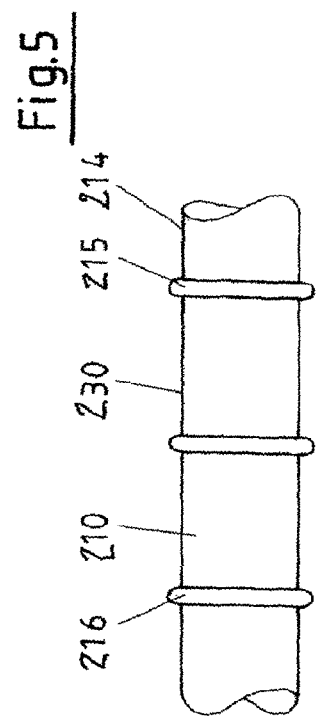

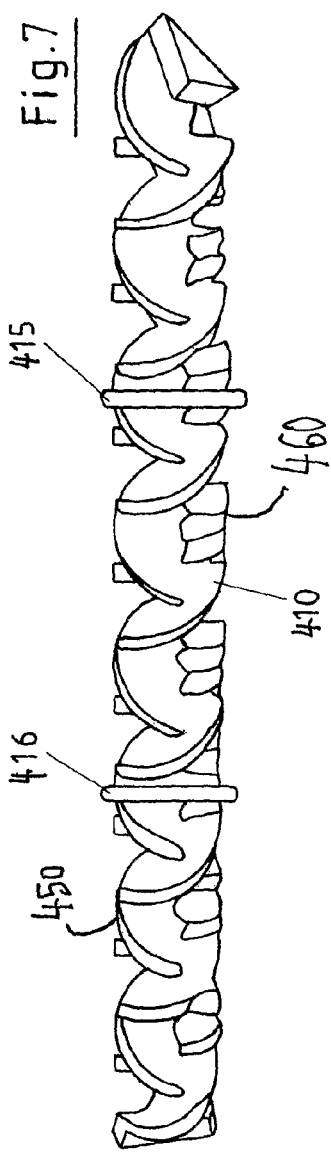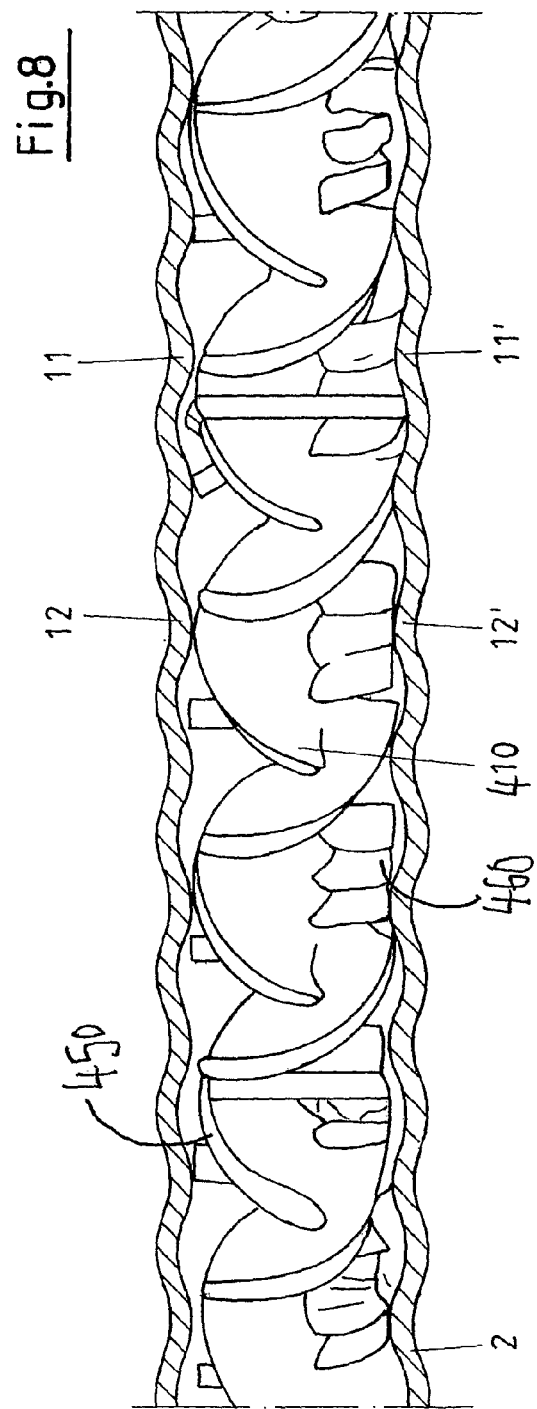

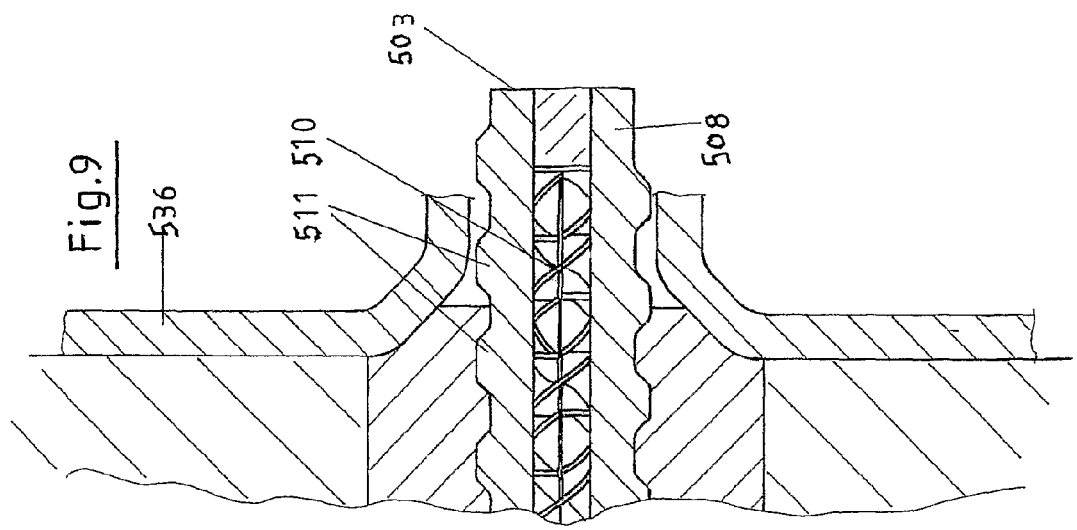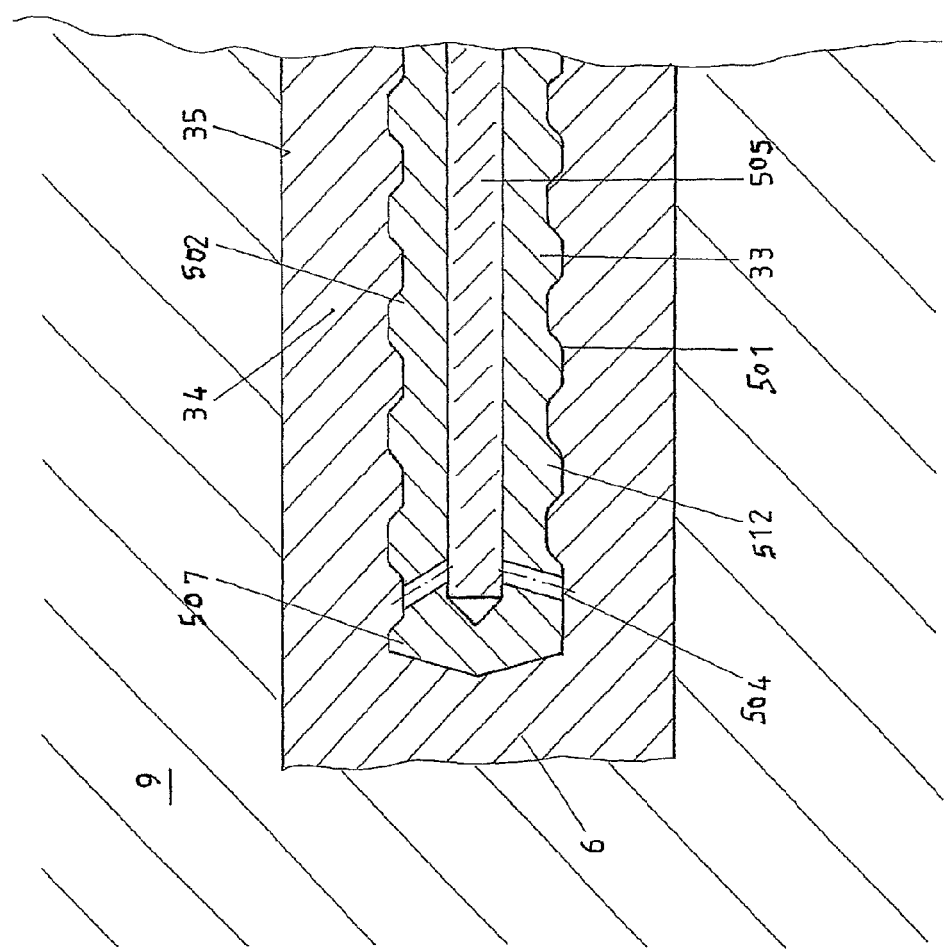

INJECTION BOLT WITH A FIXED STATIC MIXER

CROSS-REFERENCE TO RELATED APPLICATION

This Application is a Section 371 National Stage Application of International Application No. PCT/GB2007/000659, filed Feb. 26, 2007 and published as WO 2007/096651A1 on Aug. 30, 2007, the content of which is hereby incorporated by reference in its entirety.

FIELD OF THE INVENTION

The invention provides an injection bolt with a fixed static mixer and a method for its production.

BACKGROUND OF THE DISCLOSURE

Injection bolts having a static mixer are known, for example, from DE 100 17 750 A1. These injection bolts are used primarily as rock bolts for stabilising rock mass in mines in the vicinity of galleries and drifts or in stabilising a roof of a tunnel. Such an injection bolt has a shaft with an internal bore which contains the static mixer. The injection bolt generally also has a pump connector and the shaft has an outlet.

Known injection bolts are used to stabilise a rock mass as follows. Firstly, a drill bolt is used to drill a hole into the rock mass. After a suitably deep hole has been drilled, this bolt is exchanged for an injection bolt. A pump is then connected to the injection bolt's pump connector. The pump is then used to inject a multiple component anchoring material into the internal bore of injection bolt. The components of the anchoring material are mixed by the static mixer in such a way that the multiple components jointly cure very quickly once they have been ejected from the outlet of the injection bolt into the annular channel between the shaft and the rock mass. The anchoring material fills said channel and also any slots and cleat planes in the rock mass. The bolt shaft then remains in the hole and helps, in addition to the anchoring material, to secure the walls of a mined cavity.

According to an alternative method, the injection bolt may also be used in the first step as a drill bolt if it is arranged such that a drill head can be associated therewith. As this injection bolt will remain in the hole, the drill head must be inexpensive. Generally such an injection bolt will only be use in specific applications.

In order to achieve the correct mixing effect, it is generally desired to construct and arrange the static mixer in such a way that the mixed anchoring components do not have to cover a long distance before reaching the channel. This is because the longer the distance they have to cover, the greater the risk that they will cure before they reach the channel. A further requirement is that the static mixer is arranged such that the anchoring components are mixed intensively with one another.

It is therefore desirable to prevent the static mixer from issuing with the injected-in multiple anchoring components at the outlet or from leaving its predetermined position, i.e. from slipping downward in the bore of the shaft of the injection bolt.

It is also known for the multiple anchoring components to be introduced into the injection bolt while embedded in film tubes. In use, the multiple anchoring components are pressed through the static mixer. Conventional static mixers have a multistage coil formed from a plastics material with means for restricted flow diversion, such that an appropriate pressure has to be applied to purposefully press the components of the anchoring material through the static mixer. The static mixer therefore has a crucial role which it is able to realise and fulfil only if it is positioned precisely and if it is able to maintain this positioning throughout the entire operation despite the high pressure of the mortar.

The object of the invention is therefore to provide a method for producing injection bolts in which the static mixer is precisely positioned at all times and an injection bolt having a fixed static mixer, via which thorough mixing and immediate introduction of a quick-cure anchoring material are possible.

SUMMARY

According to the invention there is provided an injection bolt for use in securing a rock mass having:

a shaft for insertion into a hole in a rock mass which shaft has a profile and forms a profiled internal bore which bore has an inlet suitable for connection to an anchoring material pump and an outlet; and a static mixer for mixing multiple components of the anchoring material;

wherein the internal bore comprises the static mixer which is fixed in place by the profile.

PREFERRED EMBODIMENT

According to the invention there is further provided a method for producing an injection bolt for use in securing a rock mass which method comprises:

a providing step which comprises providing a shaft having an internal bore which bore has an inlet suitable for connection to an anchoring material pump and an outlet;

a positioning step which comprises positioning a static mixer at a location in the bore; and a rolling step which comprises rolling the shaft to provide it with a profile so as to fix the static mixer at the location without blocking the bore of the shaft.

The object of the invention is achieved by the profile which secures the static mixer at the desired location. A further advantage of the profile used in the invention is that it may ensure the permanently secure fixing of the injection bolt in the rock mass. This is because where the profile provides a corrugated surface on the shaft of the injection bolt, the anchoring material may key into the corrugations, improving the fixing of the injection bolt in the rock mass.

In the method of the invention, the injection bolt is therefore generally provided, after the production of the shaft itself, with a profile, preferably by cold rolling. A further advantage of the invention is that the inner wall of the injection bolt shaft is deformed, albeit only slightly, during the rolling-in step.

Another advantage of the invention is that a static mixer or a plurality of static mixers which have been previously inserted into the shaft of an injection bolt and positioned at an optimum location, is/are then fixed at that location during rolling in such a way that their arrangement at that location is reliably maintained during all subsequent operations involving the injection bolt. This advantage applies both to an injection bolt which is used both as a drill bolt and as an injection bolt and to an injection bolt which is not used as a drill bolt.

A further advantage of the invention is that it provides an injection bolt which ensures, on account of the precise positioning of the static mixer, that the components of the anchoring material introduced into the bore of the shaft of the injection bolt are mixed thoroughly and unimpeded. As a result of this, when they are injected into the rock mass from the outlet of the shaft, they immediately fill both the annular gap between the outer surface of the injection bolt and the wall of the hole and also any cleat planes, notches and the like.

Particularly advantageously, the static mixer used in the invention does not need a cladding or protective pipe. This is because the static mixer is fixed directly in the bore by the rolling-in step. It is also advantageous that the position of the static mixer can be precisely predetermined, wherein said position can be chosen in accordance with the expected conditions.

The static mixer may be fixed at the inlet end of the shaft. The static mixer may have an outer surface on which an adhesive ring and/or chamber is provided for securing the static mixer to the internal bore before the profile is applied to the shaft. The adhesive ring and/or chamber may be provided at an end of the static mixer. The chamber may comprise an adhesive and may be formed in an adhesive ring which has a thin wall.

The injection bolt according to the invention may comprise a plurality of static mixers which are connected to one another via a web.

The static mixer used in the invention may have an outer wall with a roughened surface.

The profile used in the invention may provide the internal bore of the shaft with an internal diameter which is less than the external diameter of the static mixer. The profile may provide the internal bore of the shaft with a corrugated or ribbed surface. The shaft of the injection bolt of the invention may have an external wall such that the profile provides the external wall of the shaft with a corrugated or ribbed surface. The profile may only be provided at a part of the shaft where the static mixer is located. Alternatively, the profile may be provided along a whole length of the shaft. The injection bolt may comprise a nut and a washer and the profile may provide a thread with which the nut can engage such that the nut and washer can be used to tighten the roof bolt against the rock mass.

The rolling step of the method according to the invention may comprise providing a profile such that the bore has an internal diameter which less than the diameter of the static mixer. The rolling step of the method according to the invention may comprise providing an internal surface of the bore with a corrugated or ribbed surface. The shaft used in the method of the invention may have an external wall and the rolling step of the method of the invention may comprise providing the external wall of the shaft with a corrugated or ribbed surface.

The static mixer used in the method of the invention may have an adhesive or an adhesive ring or chamber provided on its external surface and the positioning step of the method of the invention may comprise positioning the static mixer at the location by means of the adhesive or adhesive ring or chamber. The advantage of this feature is that precise positioning of the static mixture in the positioning step is not lost between the positioning step and the rolling step.

The positioning step of the method of the invention may comprise positioning a plurality of static mixers which connected to one another via a web.

The rolling step of the method of the invention may be performed such that a profile is provided only at the location on the shaft where the static mixer is positioned. Alternatively, the rolling step of the method of the invention may be performed such that a profile is provided along a whole length of the shaft.

The rolling step of the method of the invention may be performed such that the profile provides a thread with which a nut can engage.

In some aspects, the rolling step of the method of the invention comprises providing a profile such that the bore has a corrugated or ribbed internal surface with an internal diameter which is substantially the same as the diameter of the static mixer. As a result, the static mixer is fixed by the narrowing in cross section in the region of the inner corrugations of the profile and to be deformed therewith merely on the outside. Adjusting the pressure when rolling in the profile ensures, in accordance with this method, that the static mixer is gripped by the inner corrugations of the profiles and secured by slight deformation of the outer wall, whereas the static mixer itself, i.e., in particular, its interior components which are important for mixing, remains entirely unaffected. The static mixer itself is precisely fixed, as is required and desired, and is therefore available for the mixing process without any impediment to fixing.

According to a further optimisation of the method of the invention, provision is made for the rolling-in to be carried out in such a way that the static mixer is fixed, viewed over the length thereof, at a plurality of points, preferably by increasing the pressure in certain sections. In other words, not each of the inner corrugations of the profiles affects and secures the static mixer; instead this fixing is carried out at a plurality of provided points and this is sufficient for securing the static mixer in the internal bore of the shaft. This also ensures the improvement that the functioning of the static mixer per se is not harmed or affected by the fixing by the profiles.

The precise securing and fixing of the static mixer in the internal bore is facilitated in that the static mixer is equipped, in accordance with a development of the invention, with adhesive rings which are designed so as to prevent automatic slipping of the static mixer out of the internal bore. The static mixer per se can therefore be secured on insertion during the positioning step, for example by a rod, precisely at the location where it is to have its subsequent optimum position. The adhesive rings therefore prevent the static mixer from leaving this position again, on further handling of the bolt shaft, before it is finally secured by the rolling-in of the profiles. In addition, the position of the static mixer can, if necessary, be corrected before the profiles are formed.

A further possibility for this temporary securing of the static mixer in the internal bore during the positioning step is that in which the jacket or outer surface of the static mixer is coated, on insertion into the internal bore, with an adhesive at least at certain points. This adhesive therefore ensures that the static mixer cannot be removed from its position. A possible drawback of this is that subsequent re-positioning of the static mixer is no longer possible, because this is prevented by the adhesive.

If a plurality of static mixers is to be accommodated in a bolt shaft of this type, it is advantageous if a plurality of static mixers is produced simultaneously and are remotely connected to one another via a web. They can then be introduced, in this configuration, into the bolt shaft and fixed therein when the profiles are rolled in. Any number of static mixers can thus be accommodated, one behind another, in a bolt shaft and then finally secured by the attachment of the profiles. The advantage of this is that further measurements and the like are not necessary; on the contrary, these are finalised during the production process itself, i.e. when the static mixer is produced, so the interconnected static mixers can then be introduced into the internal bore at the provided distance from one another.

An injection bolt which is intended to achieve and is capable of achieving the object referred to hereinbefore is that in which the static mixer is rolled into the internal bore. In the case of an injection bolt or bolt shaft of this type, the attachment or rolling-in of the profiles is necessary in any case, so this operation is to be expediently and advantageously utilised to achieve the important precise positioning of the static mixer or the static mixers. It is also advantageous in this regard that this positioning, once carried out, is then also secured by the attached profiles. A static mixer of this type no longer needs to be cleaned or disposed of; instead, it remains in the injection bolt or in the bolt shaft, but has ensured in advance that the two components of the anchoring material were introduced thoroughly mixed into the target region thereof.

A particularly expedient embodiment of the invention provides for the static mixer to be made of plastics material and to be secured at the connection end of the bolt shaft via the profiles formed in the bolt shaft during cold-rolling. The static mixer is secured at the same time as the profiles are attached "cold", i.e. without an additional operation. There is no need for a cladding pipe around the static mixer or any particular precautions, because the thickness of the shaft wall prevents the pressure on the static mixer from leading to deformations of the frame of the static mixer. Finally, the static mixer can be secured precisely in the position resulting in most successful mixing.

According to a further expedient embodiment of the invention, provision is made for the static mixer to be fixed by purposeful deformation of the bolt shaft, and therefore also of the inner wall, at certain points therein. Suitable deformation or variations of the deforming work allow the static mixer to be fixed purposefully at specific points and not over the entire length, thus additionally ensuring that the mode of operation of the fixed static mixer is in any case guaranteed. Obviously, it is also possible effectively to fix the static mixer, over the entire length thereof, via the profiles in the bolt shaft.

Precise positioning of the static mixer in the internal bore and securing of the position, once assumed, is possible, in particular, if the static mixer has adhesive rings on the outer walls or integrated therein. The static mixer is thus inserted into the internal bore by overcoming a certain frictional force, so once it has assumed its provided position it cannot be moved out of it unintentionally or automatically. The subsequent attachment of the profiles then completes the final fixing of the static mixer.

To reduce the costs of static mixers of this type, provision is made for the adhesive rings to be arranged distributed over the length of the static mixer, preferably at both end regions of the static mixer. Such reduction of the number of adhesive rings is readily justifiable, because this reliably prevents the static mixer from slipping out. It may also be sufficient for an adhesive ring of this type to be provided at merely one point and, in this case, probably expediently centrally.

In particularly critical situations, it can be expedient to form chambers with an adhesive in an adhesive ring which have a thin wall at a certain point or continuously. The adhesive ring may in this case no longer need to perform their function which is fulfilled by the adhesives guided or pressed out of the chamber.

If a plurality of static mixers is used within an injection bolt, it is advantageous if a plurality of static mixers are arranged so as to be connected to one another via a web, preferably an injection-moulded web, in the internal bore in the bolt shaft. Appropriately choosing the length of the, preferably injection-moulded, web thus allows the precise position, or more accurately the precise subsequent position, of the static mixers to be defined in advance and also to be precisely adhered to on introduction into the injection bolt.

A further possibility for expediently securing a static mixer within the internal bore up to attachment of the profiles is that in which the outer wall of the static mixer are roughened. Especially if use is made of a static mixer having a diameter approximately identical to that of the inner walls of the internal bore, a roughened surface of this type can be sufficient to ensure temporary securing in the internal bore.

In order to optimise the use of a fixed static mixer even for one-way injection bolts (i.e. an injection bolt used both for forming a hole in the rock mass and as an injection bolt), provision is made for the water duct of the static mixer or the static mixers as a whole to be constructed so that it cannot be influenced by the rolling-in process. Water is used to transport away the drilled material released during the formation of the hole through the annular gap around the bolt rod and out of the hole. Even if the injection bolt is used in such a way, the static mixers subsequently remain in the bolt rod, but are used twice, i.e. once for feeding through the water during drilling and secondly on introduction of the two anchoring material components.

The invention is distinguished, in particular, in that there are provided a method and an injection bolt with which any anchoring materials can be used. As a result of the fact that the static mixer is now precisely secured in the injection bolt, it can be ensured even in the case of complex anchoring materials, i.e. plastics material mortars, that these components are purposefully mixed at the optimum point and are then issued into the "rock mass". There is therefore substantially no risk of the components being incompletely mixed together or mixed prematurely or too late; instead, it is generally ensured that the mixing is performed at an optimum point in time and at a precise point in the length of the bolt shaft. The described solution can be used both in one-way and in two-way bolts, because the static mixers are fixed by the profiles so as to allow rinsing water and plastics material components to pass.

According to the invention there is further provided a second method for producing an injection bolt comprising a profile, wherein the profile is rolled in while preserving an internal bore through which a multiple component anchoring material is pressed through via a static mixer into an annular channel between the injection bolt and rock mass, characterised in that the static mixer is positioned in the provided region prior to rolling-in of the profile and is then fixed at this location during rolling-in.

According to the invention there is also provided a second injection bolt, especially for use in extending underground mine and tunnel constructions with a long shaft comprising an internal bore and a bore mouth-side pump connection and opposing outlet for the components of an anchoring material flowing via the internal bore in the shaft and with a static mixer for mixing the components before they issue into an annular channel around the shaft, characterised in that the static mixer is rolled into the internal bore.

BRIEF DESCRIPTION OF THE DRAWINGS

Further details and advantages of the subject-matter of the invention will emerge from the following description of the associated drawings showing a preferred embodiment with the details and individual parts required therefor. Thus the invention will now be illustrated with reference to the Figures of the accompanying drawings which are not intended to limit the scope of the invention claimed in which:

FIG. 1 shows a longitudinal cross-sectional view of a first embodiment of an injection bolt according to the invention introduced into a rock mass;

FIG. 2 shows a transverse cross-sectional view of a known injection bolt which has been introduced into the rock mass;

FIG. 3 shows a transverse cross-sectional view of an injection bolt according to the first embodiment introduced into the rock mass with profiles and a static mixer;

FIG. 4 shows a longitudinal cross-sectional view of a profiled injection bolt for use in the first or second embodiment of the invention;

FIG. 5 is a side view of a static mixer with adhesive rings for use in the first or second embodiment of the invention;

FIG. 6 is a transverse cross-sectional view of an injection bolt according to the first embodiment in the region of the fixed static mixer;

FIG. 7 shows a static mixer without a cladding pipe;

FIG. 8 shows a longitudinal cross-sectional view of the static mixer shown in FIG. 7 inserted into an injection bolt, and FIG. 9 shows a cross section of a second embodiment of an injection bolt according to the invention which is secured in a rock mass.

DETAILED DESCRIPTION OF ILLUSTRATIVE EMBODIMENTS

FIG. 1 shows a longitudinal cross-sectional view of an injection bolt 1 introduced into a hole which has been drilled in a rock mass 9. The injection bolt 1 has a bolt shaft 2 which has a proximal end 8, positioned in use at the mouth of the hole, and a distal end 7, positioned in use at the bottom 6 of the hole, at which is provided an outlet 4.

The proximal and distal ends 8,7 of bolt shaft 2 are connected by an internal bore 5 which has an inner wall 19. At the proximal end 8 of the bolt shaft 2, the injection bolt 1 has a spherical cap (shown) which seals the hole, and a pump connection 3. The pump connection 3 allows the internal bore 5 of the bolt shaft 2 to be connected to a pump (not shown) of an anchoring material.

In the internal bore 5 of the bolt shaft 2, there is provided a static mixer 10 at the proximal end 8 and an auxiliary static mixer 10' at the distal end 7; the details of the static mixers will be illustrated and described hereinafter. The static mixers 10,10' are connected by web 21 which is provided to ensure that the static mixers 10,10' remain in a predetermined position after insertion until they are fixed in that position by the cold rolling of profiles 11,12. Auxiliary static mixer 10' has a proximal end 18 and a distal end 17.

The bolt shaft 2 has profiles 11,12 which are rolled in "cold". Profiles 11,12 have the appearance of a waveform having a wavelength which is parallel to the length of the bolt shaft 2 such that the bolt shaft 2 has a corrugated or ribbed surface. The static mixers 10,10' are fixed in place by profiles 11,12. As an alternative, the profiles 10,10' may provide the bolt shaft 2 with a threaded surface to which a nut may engage.

The profiles 11,12 also improve and ensure the securing of the injection bolt 1 in the hole and therefore in the rock mass 9. This is because the ribbing on the surface of the bolt shaft 2 enables the anchoring material to engage with the injection bolt 1 to ensure it is securely anchored in the hole. The annular space 13 between the rock mass 9 and bolt shaft 2 is filled by the mixed components of the anchoring material, so the bolt shaft 2, i.e. in other words the injection bolt 1 as a whole, can no longer be extracted from the hole or can be extracted only by destroying the bolt shaft 2.

The pump connection 3 allows a multiple component anchoring material (not shown) to be injected through the internal bore 5 down to the bottom 6 of the hole and into the rock mass 9. Said static mixers 10,10' ensure that the multiple components of the anchoring material injected into the internal bore 5 are mixed uniformly and thoroughly.

FIG. 2 shows a transverse cross sectional view of known injection bolt 100 which has been inserted in a hole. Known injection bolt 100 has a bolt shaft 102 having an internal bore 105 which has an internal wall 119. Known injection bolt 100 lacks without a static mixer 10 and profiles 11, 12.

FIG. 3 is a transverse cross section through the bolt shaft 2 of an injection bolt 1 in the region of the static mixer 10. In FIG. 3, the presence of the profiles 11,12 is shown by profiles 11,12 which have a waveform with a circumferential wavelength for the purposes of illustration such that it is clear that the profiles 11, 12 provide the desired fixing. Thus, instead of the longitudinal profiles shown in FIG. 3, the bolt shaft 2 of the injection bolt 1 according to the invention is provided in reality, as shown in FIG. 4, with transverse or threaded profiles.

FIG. 4 is a longitudinal cross-sectional view of part of bolt shaft 2 in the region of the static mixer 10. In FIG. 4, the original internal diameter 24 of the bolt shaft 2 is shown to be larger than the minimum internal diameter 26 provided by the profiles 11,12. However, the maximum internal diameter 25 is larger than the original internal diameter 24. The maximum internal diameter 25 is obtained after introduction of the profiles 11,12. The wave height of the waveform of profiles 11,12 is the difference between the maximum internal diameter 25 and minimum internal diameter 26. The profiles 11,12 at their minimum internal diameter 26 fix the static mixers 10,10' in place.

FIG. 5 shows a perspective view of a second static mixer 210 for use in the invention. Static mixer 210 has an outer wall 214 which is provided with a cladding pipe 230. Attached to the outer wall 214 of the static mixer 210 are adhesive rings 215,216. The adhesive rings 215,216 are provided to ensure that in use, the static mixer 210 is not able to be dislodged from its position, once it has been inserted and precisely positioned in the internal bore 5 of a bolt shaft 2 until it is finally secured via the cold rolling of profiles 11,12. As an alternative, adhesive rings 215,216 can only be arranged at the proximal end 18 of the static mixer 10' or only at the distal end 17 or at both ends 17,18. The external diameter of the static mixer 10,10' at the adhesive rings 215,216 is greater than the internal diameter of the bolt shaft 2 such that the adhesive rings 215,216 rub against the inner wall 19 of the bolt shaft 2. As a result, a degree of force is required in order to insert the static mixer 10,10'. This has the advantage that the static mixer cannot, however, be removed again from the internal bore 5 or its precise position, even if the bolt shaft 2 is standing perpendicularly. As an alternative to the embodiment shown in FIG. 5, adhesive rings 215,216 may be used with a static mixer 10,10' which lacks a cladding pipe 230. FIG. 7 illustrates a static mixer of this type without a cladding pipe.

FIG. 6 shows a transverse cross-sectional view of a third static mixer 310 for use in the invention. Static mixer 310 is similar to second static mixer 310 in that it has an outer wall (not shown) and a cladding pipe (not shown) on which is provided an adhesive ring 315. Formed in adhesive ring 315 are a plurality of chambers 320, each of which is filled with adhesive. When static mixer 310 is inserted into a bolt shaft 2, the chambers 320 are breached such that the adhesive adheres the static mixer 310 to the internal wall 19 of the internal bore 5 of the bolt shaft 2. As an alternative to this embodiment, the static mixer 310 may lack an adhesive ring 315 such that an adhesive chamber 320 is arranged on the outer wall of the static mixer 310 in order to achieve securing at a predetermined position on insertion of the static mixer 310 into an internal bore 5 of a bolt shaft 2 and destruction of the walls of the adhesive chamber 320.

FIG. 7 shows a perspective view of a static mixer 410 which lacks a cladding pipe. Static mixer 410 is shown to have a helically twisted mixing element 450 having helical barriers 460. Static mixer 410 also has adhesive rings 415,416. In use, the components to be mixed are pressed by the mixing element 450 and helical barriers 460 and are thus intensively mixed. Because static mixer 410 is secured in the bolt shaft 2 by profiles 11,12, the bolt shaft 2 itself acts at the same time as a cladding pipe for the static mixer 10.

FIG. 8 shows a longitudinal cross-sectional view of the fourth static mixer 410 for use in the invention inserted into an injection bolt 2 wherein the adhesive rings 15, 16 shown in FIG. 7 tan no longer be discerned or are not provided at all.

FIG. 9 shows a cross section of a second embodiment of an injection bolt 501 according to the invention which is secured in a rock mass 9 after completion of the injection operation.

The injection bolt 501 has a bolt shaft 502 which has a proximal end 508, positioned at the mouth of the hole, and a distal end 507, positioned at the bottom 6 of the hole, at which is provided an outlet 504.

The proximal and distal ends 508,507 of bolt shaft 502 are connected by an internal bore 505. At the proximal end 508 of the bolt shaft 502, the injection bolt 501 has a washer (536) which seals the hole, and a pump connection 503. The pump connection 503 allows the internal bore 505 of the bolt shaft 502 to be connected to a pump (not shown) for the supply of an anchoring material 34.

In the internal bore 505 of the bolt shaft 502, a single static mixer 510 is provided at the proximal end 508. The bolt shaft 502 has external threaded profiles 511,512 which are rolled in "cold". The profiles 511,512 do not provide the interior (internal bore 505 facing side) of bolt shaft 502 with corrugated or ribbed profiles. Instead, the internal diameter of the bore 505 is reduced, thereby fixing the static mixer 510 in place. The threaded profiles 511,512 also improve and ensure the securing of the injection bolt 501 in the hole and therefore in the rock mass 9.

The pump connection 503 allows a multiple component anchoring material 34 to be injected through the internal bore 505 down to the bottom 6 of the hole and into the rock mass 9. Said static mixer 510 ensures that the multiple components of the anchoring material 34 injected into the internal bore 505 are mixed uniformly and thoroughly.

The hole formed in the rock mass 9 is filled completely, from the bottom 6 of the hole to the mouth of the hole, with anchoring material 34. Anchoring material 34 fills both the annular channel 33 between the bolt shaft 402 and walls 35 of the hole and the internal bore 505. As may be seen, anchoring material 34 reaches into the region of washer 536. Washer 536 is pressed against the rock mass 9 via a bolt nut (not shown) which is displaceable on the thread provided by the profiles 511,512 of the bolt shaft 502. The static mixer 510 is also filled by the anchoring material 34.

All of the aforementioned features, even those which can be inferred from the drawings alone, are regarded, in isolation and in combination, as being instrumental to the invention.

Although the present invention has been described with reference to preferred embodiments, workers skilled in the art will recognize that changes may be made in form and detail without departing from the spirit and scope of the invention.

The invention claimed is:

1. An injection bolt for use in securing a rock mass having:
   a shaft for insertion into a hole in the rock mass which shaft has a profile and forms a profiled internal bore which bore has an inlet suitable for connection to an anchoring material pump and an outlet for injecting anchoring material into the hole in the rock mass; and
   a static mixer for mixing multiple components of the anchoring material;
   wherein the internal bore comprises the static mixer which is fixed in place by the profile and wherein the profile is provided along a length of the shaft at a part of the shaft where the static mixer is located or along a whole length of the shaft and wherein the profile reduces the internal diameter of the internal bore to be less than the external diameter of the static mixer.

2. The injection bolt as defined in claim 1 wherein the static mixer is fixed at the inlet end of the shaft.

3. The injection bolt as defined in claim 1 wherein the static mixer has an outer surface on which an adhesive ring or chamber or both is provided for securing the static mixer to the internal bore before the profile is applied to the shaft.

4. The injection bolt as defined in claim 3 wherein the adhesive ring or chamber or both is provided at an end of the static mixer.

5. The injection bolt as defined in claim 3 wherein the chamber comprises an adhesive and is formed into the adhesive ring.

6. The injection bolt as defined in claim 1 and further comprising a plurality of static mixers which are connected to one another via a web.

7. The injection bolt as defined in claim 1 wherein the static mixer has an outer wall with a roughened surface.

8. The injection bolt as defined in claim 1 wherein the profile provides the internal bore of the shaft with a corrugated or ribbed surface.

9. The injection bolt as defined in claim 1 wherein the shaft has an external wall and wherein the profile provides the external wall of the shaft with a corrugated or ribbed surface.

10. The injection bolt as defined in claim 1 wherein the injection bolt comprises a nut and a washer and wherein the profile provides a thread with which the nut can engage such that the nut and washer can be used to tighten the roof bolt against the rock mass.

11. The injection bolt as defined in claim 1 wherein the profile is only provided at a part of the shaft where the static mixer is located.

12. The injection bolt as defined in claim 1 wherein the profile is provided along a whole length of the shaft.

13. A method for producing an injection bolt for use in securing a rock mass which method comprises:
   a providing step which comprises providing a shaft having an internal bore which bore has an inlet suitable for connection to an anchoring material pump and an outlet;
   a positioning step which comprises positioning a static mixer at a location in the bore; and
   a rolling step which comprises rolling the shaft to provide the shaft with a profile so as to fix the static mixer at the location without blocking the bore of the shaft;
   wherein the rolling step is performed such that a profile is provided along a length of the shaft at a part of the shaft where the static mixer is located or along a whole length of the shaft and wherein the profile reduces the internal diameter of the internal bore to be less than the external diameter of the static mixer.

14. The method as defined in claim 13 wherein the rolling step comprises providing a profile such that the bore has an internal diameter which is less than the diameter of the static mixer.

15. The method as defined in claim 13 wherein the rolling step comprises providing an internal surface of the bore with a corrugated or ribbed surface.

16. The method as defined in claim 13 wherein the shaft has an external wall and wherein the rolling step comprises providing the external wall of the shaft with a corrugated or ribbed surface.

17. The method as defined in claim 13 wherein the static mixer has an adhesive or an adhesive ring or chamber provided on its external surface and wherein the positioning step comprises positioning the static mixer at the location by means of the adhesive or adhesive ring or chamber.

18. The method as defined in claim 13 wherein the positioning step comprises positioning a plurality of static mixers which connected to one another via a web.

19. The method as defined in claim 13 wherein the rolling step is performed such that the profile provides a thread with which a nut can engage.

20. The method as defined in claim 13 wherein the rolling step is performed such that a profile is provided only at the location on the shaft where the static mixer is positioned.

21. The method as defined in claim 13 wherein the rolling step is performed such that a profile is provided along a whole length of the shaft.

\* \* \* \* \*